United States Patent [19]

Schröder

[11] Patent Number: 5,772,165
[45] Date of Patent: Jun. 30, 1998

[54] EXTERNAL ROTATION STOP AND EXTENSION LIMITER FOR A SADDLE OF A CYCLE

[76] Inventor: Günter Schröder, Schillerstrasse 7, 66780 Siersburg, Germany

[21] Appl. No.: 786,763

[22] Filed: Jan. 21, 1997

[30] Foreign Application Priority Data

Jan. 18, 1996 [DE] Germany .......................... 196 01 635.5

[51] Int. Cl.$^6$ .................................................. F16M 13/00
[52] U.S. Cl. ...................... 248/188.5; 248/600; 248/601
[58] Field of Search ................................ 248/188.5, 573, 248/600, 601, 602

[56] References Cited

U.S. PATENT DOCUMENTS

| 635,709 | 10/1899 | Andrew | 248/601 |
|---|---|---|---|
| 3,229,954 | 1/1966 | Hendricks | 248/600 |
| 4,455,010 | 6/1984 | Butler | 248/602 |
| 4,736,983 | 4/1988 | Furbee | 248/600 |
| 5,024,413 | 6/1991 | Papp | 248/601 |
| 5,370,351 | 12/1994 | Chen . | |

FOREIGN PATENT DOCUMENTS

| 651151 | 4/1936 | Germany . |
|---|---|---|
| 4031273 | 5/1991 | Germany . |

Primary Examiner—Victor N. Sakran
Attorney, Agent, or Firm—Walter Ottesen

[57] ABSTRACT

An arrangement 10 includes at least one straight rod 11 which is connected to the saddle support frame or to the support 20 carrying the saddle support frame. The arrangement 10 prevents rotation of the saddle about the longitudinal axis of the support 20 and limits the stroke of the support in the rearward inclined tube of the cycle frame and therefore fixes the highest elevation to which the saddle can be adjusted. The arrangement also prevents theft of the assembly comprising the saddle and its support. In a case of a closed frame, the arrangement 10 includes a U-shaped rod defined by two legs on respective sides of the transverse tube 32 of the cycle frame. The U-shaped rod includes a bight portion 17 which connects the two lower ends of the rod 11. The bight portion 17 limits the stroke of the support 20 and makes theft of the assembly of saddle and support difficult.

7 Claims, 4 Drawing Sheets

500
EXTERNAL ROTATION STOP AND EXTENSION LIMITER FOR A SADDLE OF A CYCLE

FIELD OF THE INVENTION

The invention relates to an arrangement having a rotation stop with an integrated extension limiter for a saddle of a cycle, especially for a bicycle.

BACKGROUND OF THE INVENTION

Cycle saddles are guided in a tube of the frame of the cycle and are conventionally fixed in position with the aid of threaded fasteners. The saddle support is fixed in elevation in the frame tube and fixed against rotation. During travel, saddles of this kind are not adjustable in elevation even though an adjustment in elevation during travel is desirable for ergonomic and safety reasons. In German Patent 651, 151, an adjustable saddle support is disclosed wherein the upper part of the saddle support is configured hexagonally when seen in section in order to provide a rotation stop. A saddle support configured in accordance with this patent cannot be produced from a simple tube and is expensive with respect to its assembly. Also, the saddle elevation for its lowest saddle position is greater because of the guide of the hexagonal section and a guide bearing mounted on the cylinder. This significantly reduces fulfilling an object of the invention of enabling the rider to bring both feet to the road surface.

U.S. Pat. No. 5,370,351 discloses a shock absorbing assembly for a bicycle seat. In this assembly, the saddle support is secured against rotation about its own axis in that a rod 23 extends transversely through the support. The rod 23 has bores at respective ends thereof and mutually parallel pins extend through these bores. The pins 24 are held secure between two end plates 21 and 22. The length of the travel path of the saddle support is determined by the spacing of the two end plates.

German patent publication 4,031,273 is also directed to a shock absorbing telescopic tube. The drawing of this publication shows that a guide element is provided which comprises a piston which plunges into and moves out of a cylinder closed at its lower end. The parts of the telescopic tube assembly are so configured that no rotation takes place relative to the longitudinal axis thereof. This guide element is, however, not suitable to limit the outward movement of the movable telescopic member nor to prevent a rapid removal of the device from the bicycle.

U.S. patent application Ser. No. 08/740,350, filed Nov. 8, 1996, is incorporated herein by reference and discloses an arrangement for adjusting the elevation of a saddle of a cycle. The arrangement includes a guide element in a cup-shaped expansion of a hollow body. This expansion is located at the upper end of hollow body. This is purposeful and necessary for noncircular cross sections of the support tube. For circular cross sections of the support tube, however, the cup-shaped expansion increases the manufacturing cost of the hollow body and increases the above-mentioned lowest position of the saddle in elevation.

SUMMARY OF THE INVENTION

It is an object of the invention to provide a rotation stop for a cycle saddle which is robust and easy to manufacture. It is a further object of the invention to provide such a rotation stop for a cycle saddle which can be adjusted during movement of the cycle. It is still another object of the invention to provide an arrangement which limits the adjustment of the saddle in elevation and which secures the assembly of the saddle and saddle support against theft.

The arrangement of the invention is for externally securing a saddle of a cycle against rotation and for limiting the distance to which the saddle can be raised in elevation relative to the cycle frame. The arrangement includes: a support for supporting the saddle and defining a first longitudinal axis; a straight rod having first and second longitudinal ends and defining a second longitudinal axis parallel to the first longitudinal axis; attachment means for connecting the first end of the rod to the support or to the saddle; and, the second end of the rod being configured so as to connect the second end to the cycle frame to prevent disconnection therefrom as long as the attachment means is not interrupted.

With the external rotation stop of the arrangement of the invention, the possibility is provided to stabilize the saddle in its alignment in the frame of the cycle even when large torques are present as well as to eliminate the disadvantages described initially herein. The arrangement of the invention affords the possibility to reliably limit the upward extension of the support tube and therefore to fix the highest adjustment in elevation of the saddle without difficulty.

The above objects of the invention are achieved for both open and closed cycle frames in accordance with the same principle but utilizing a different number of rods and with a somewhat different rod guidance arrangement.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
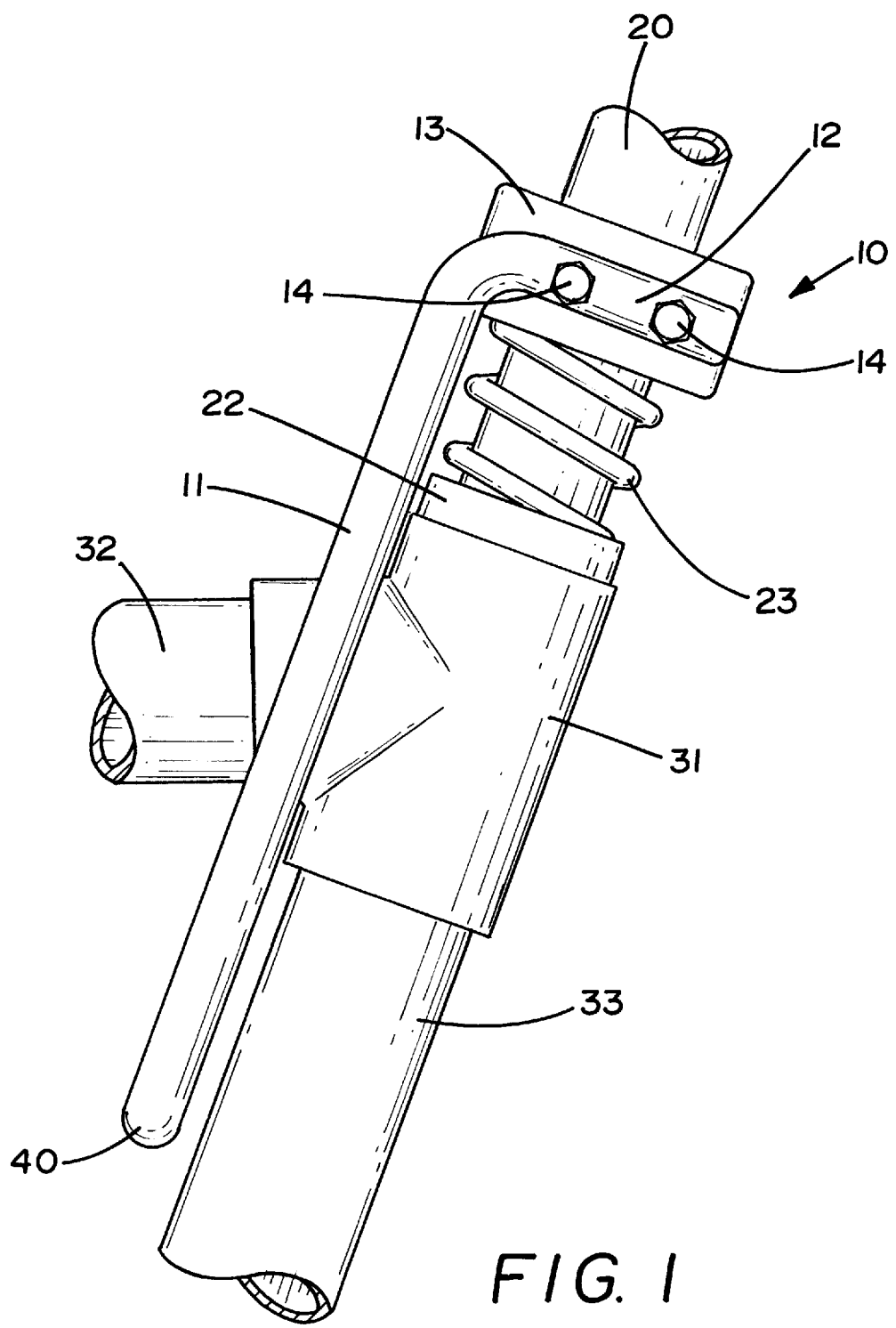
FIG. 1 is a side elevation view of a first embodiment of the arrangement according to the invention for providing an external rotation stop and for limiting the uppermost position of the saddle support and saddle as applied to a bicycle having a closed frame.
Figure 2:
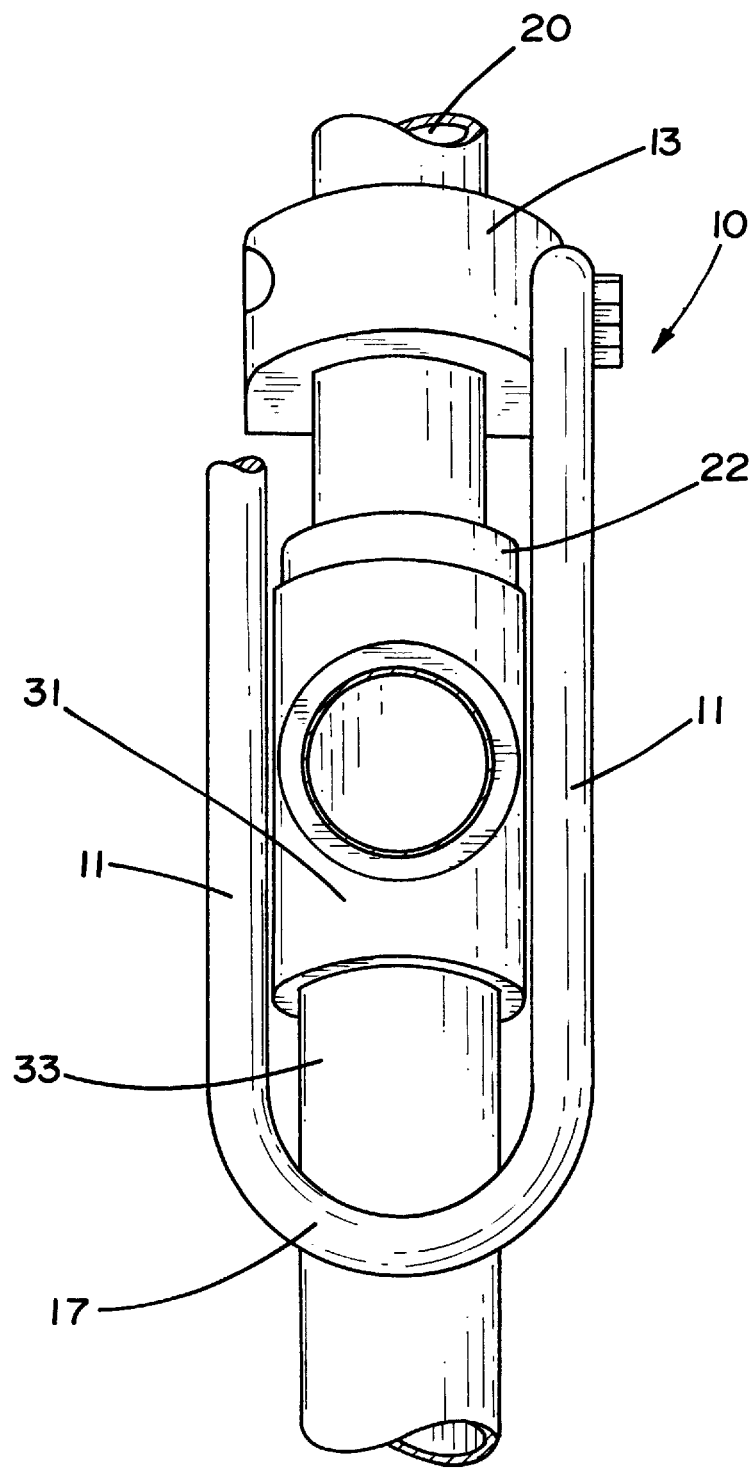
FIG. 2 is a front elevation view of the embodiment of the arrangement of the invention shown in FIG. 1.

The arrangement 10 of the invention includes a U-shaped bracket having upwardly extending legs 11 and a bight portion 17 connecting the two legs to form the U-shaped bracket 40. The legs run parallel to the longitudinal axis of the inclined rearward tube 33 of the cycle frame. The tube 33 is joined to transverse tube 32 by joint member 31. The two legs with the connecting bight portion 17 lie in a plane which is perpendicular to the main plane defined by the frame of the cycle. The U-shaped bracket extends around the transverse tube 32 of the cycle frame and is attached to the support 20 via a collar 13 fixedly attached to the support 20 or is attached to the support of the saddle. Fasteners 14 secure the U-shaped bracket 40 to the collar 13.

The support and saddle are prevented from rotating by the transverse tube 32 which acts as a stop to the legs 11. The bight portion 17 comes in contact with the transverse tube 32 when the saddle is adjusted upwardly in elevation and thereby limits the extent to which the seat post or support 20 can be adjusted in elevation. Not only does the bight portion 17 limit the adjustment in elevation but it makes it substantially more difficult for an unauthorized person to remove the assembly of saddle and support from the bicycle frame thereby providing considerable protection against theft.

In the side elevation view of FIG. 1, the cylinder spring 23 is shown which can be advantageously used to dampen the stop of the saddle and support before reaching the lowest adjustment position in elevation as the support 20 moves in elevation relative to inclined rearward tube 33. This is especially advantageous for cycle frames which are overall lower in elevation. The spring 23 bears against the end portion 22 of tube 33.

Figure 3:
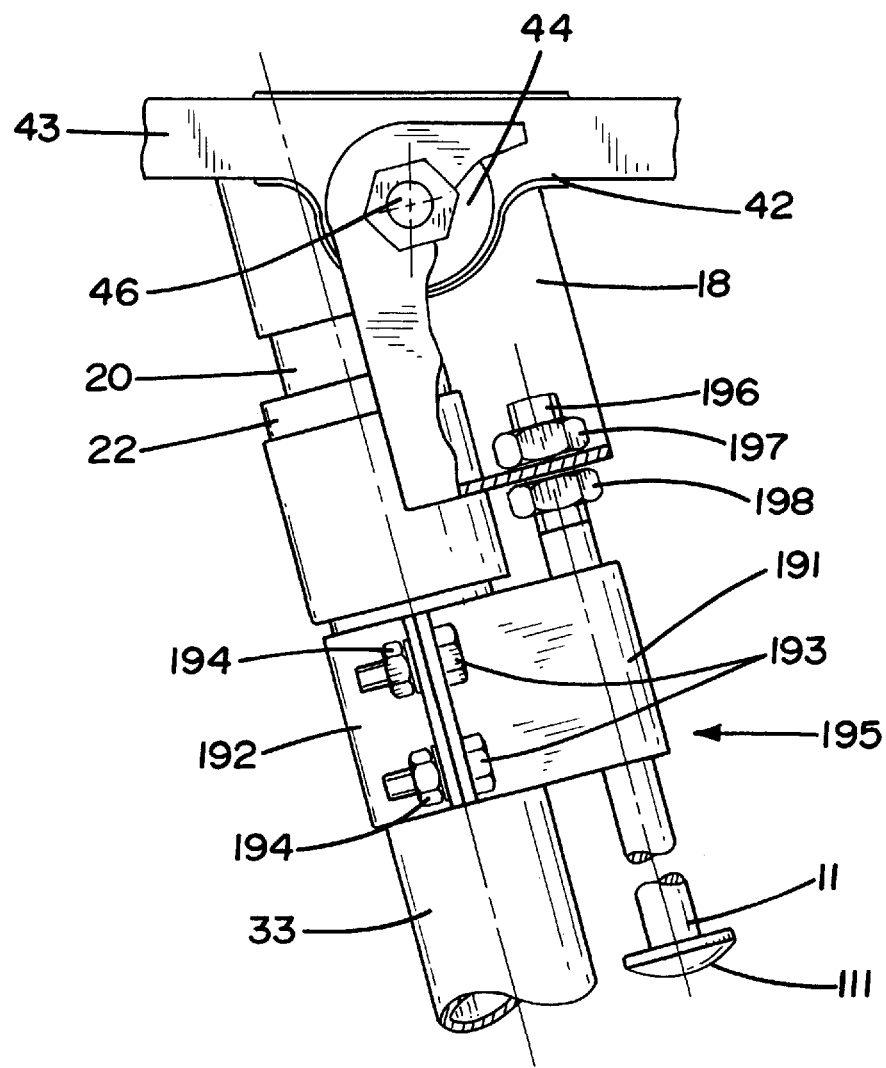
FIG. 3 is a side elevation view of a second embodiment of the arrangement of the invention as applied to a bicycle having an open frame; and, FIG. 4 is a front elevation view of the second embodiment shown in FIG. 3.
Figure 4:
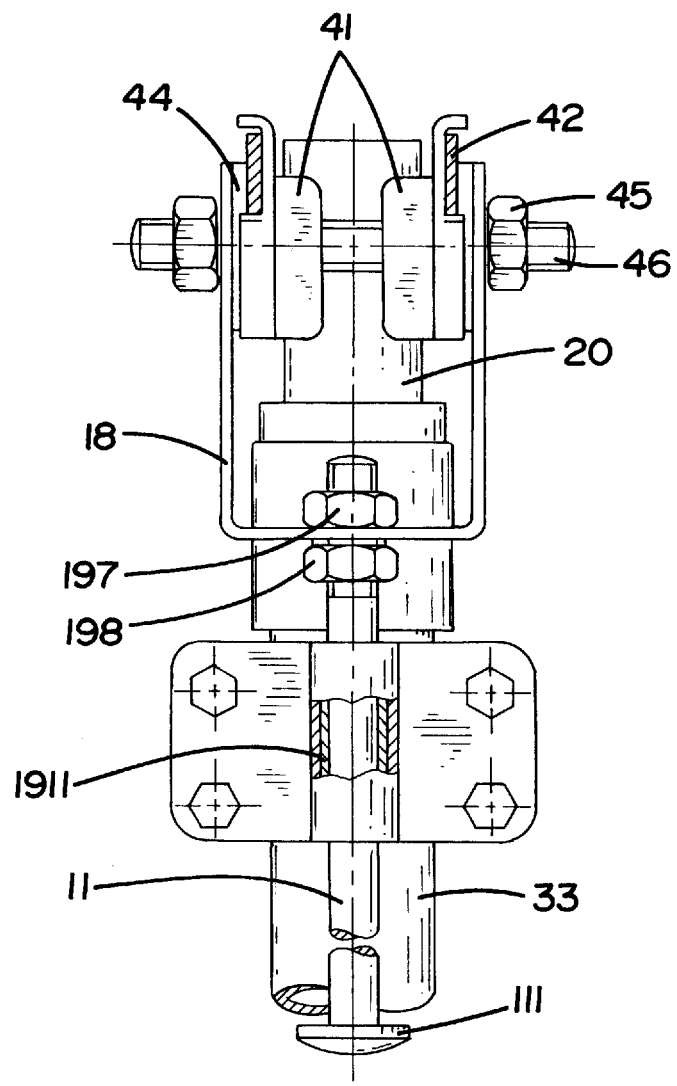

Referring now to FIGS. 3 and 4, this embodiment of the device of the invention includes a linear rod 11 guided in a bushing 195 mounted to the inclined rearward tube 33 of the open frame. The rod 11 has a thickened end portion 111 which limits the upward movement of the rod 11. The rod 11 is parallel to the longitudinal axis of the inclined rearward tube 33 and lies in the main plane of the cycle frame. The bushing 195 is clamped to the inclined tube 33 with the aid of threaded fasteners comprising bolts 193 and nuts 194. The bushing 195 comprises brackets 191 and 192 and these are held together by the threaded fasteners. The rod 11 has a threaded end portion 196 and nuts (197, 198) and is attached to the saddle frame 43 via bracket 18 as shown. Alternatively, the rod 11 could be attached to seat post 20 via intermediate members (not shown).

Rotation of the support 20 and saddle is prevented by the coaction of the rod 11 and the inner wall 1911 of the bushing 195. Stated otherwise, the bushing 195 acts as a stop for the rod 11 in the event that lateral forces are applied to the saddle which would otherwise tend to rotate the saddle about the longitudinal axis of the inclined tube 33. The head 111 formed at the lower end of the rod 11 fixes the highest adjustment in elevation of the saddle and discourages theft of the assembly comprising the saddle and its support 20.

Elements of the saddle support structure are identified in FIGS. 3 and 4 by reference numerals 41 to 46. Reference numeral 43 indicates the longitudinal support on which the saddle seat is mounted.

It is understood that the foregoing description is that of the preferred embodiments of the invention and that various changes and modifications may be made thereto without departing from the spirit and scope of the invention as defined in the appended claims.

What is claimed is:

1. An arrangement for externally securing a saddle of a cycle against rotation and for limiting the distance to which the saddle can be raised in elevation relative to the cycle frame, the cycle frame including an upwardly extending frame member and the arrangement comprising:

a support assembly including a mount for supporting said saddle and an elongated supporting member connected to said mount;

said elongated supporting member defining a first longitudinal axis;

said elongated supporting member extending downwardly to slideably engage said upwardly extending frame member thereby facilitating the movement of said support assembly and said saddle upwardly and downwardly in elevation relative to said cycle frame;

a rod unit having first and second longitudinal end portions and said rod unit defining a second longitudinal axis parallel to said first longitudinal axis;

attachment means for fixedly connecting said first end portion of said rod unit to said support assembly so as to be laterally offset from said elongated supporting member whereby said rod unit moves in elevation with said support assembly in spaced relationship to said elongated supporting member; and, said second end portion of said rod unit being configured so as to engage said cycle frame to limit the upward movement of said support assembly and said saddle relative to said cycle frame and to prevent an unwanted disconnection thereof from said cycle frame.

2. The arrangement of claim 1, said rod unit extending downwardly so as to be continuously adjacent a portion of said cycle frame during said movement so as to prevent said rotation of said elongated supporting member and said saddle relative to said upwardly extending frame member about said first longitudinal axis.

3. The arrangement of claim 1, said upwardly extending frame member being a tubular frame member; and, said elongated supporting member likewise being a tubular member and being telescopically engaged in said upwardly extending frame member.

4. The arrangement of claim 1, said rod unit being a single straight rod defining said second longitudinal axis; said second longitudinal end portion of said straight rod defining a thickening having a first diameter; a guide assembly fixedly mounted to said upwardly extending frame member so as to form part of said cycle frame and having a bushing for slideably engaging said straight rod thereby preventing said rotation of said elongated supporting member and said saddle relative to said upwardly extending frame member about said first longitudinal axis; and, said bushing having a second diameter less than said first diameter thereby limiting said upward movement of said support assembly and said saddle relative to said cycle frame and to prevent said disconnection thereof from said cycle frame.

5. The arrangement of claim 1, wherein said support assembly, said saddle and said rod unit conjointly define a structure completely separate and apart from said cycle frame thereby permitting said structure to be fitted to any cycle having a conventional cycle frame.

6. An arrangement for externally securing a saddle of a cycle against rotation and for limiting the distance to which the saddle can be raised in elevation relative to the cycle frame, said cycle frame being a closed frame having a transverse tube and an inclined rearward tube and fitting connecting said tubes to each other, the arrangement comprising:

a support assembly including a mount for supporting said saddle and defining a first longitudinal axis;

a rod having first and second longitudinal ends and defining a second longitudinal axis parallel to said first longitudinal axis;

attachment means for connection said first end of said rod to said support assembly;

said second end of said rod being configured so as to connect said second end to said cycle frame to prevent disconnection therefrom as long as said attachment means is not interrupted;

said rod being configured to define a U-shaped configuration including first and second legs connected to each other by a bight segment;

said first leg having said first end; and, said U-shaped rod enclosing said transverse frame tube or said fitting whereby said bight portion contact engages at least one of said transverse frame tube and said fitting to limit the distance to which said saddle can be raised in elevation relative to said cycle frame.

7. An arrangement for externally securing a saddle of a cycle against rotation and for limiting the distance to which the saddle can be raised in elevation relative to the cycle frame, said cycle frame being an open frame having an inclined rearward tube, the arrangement comprising:

a support assembly including a mount for supporting said saddle and defining a first longitudinal axis;

a straight rod having first and second longitudinal ends and defining a second longitudinal axis parallel to said first longitudinal axis;

attachment means for connecting said first end of said rod to said support assembly;

said second end of said rod being configured so as to connect said second end to said cycle frame to prevent disconnection therefrom as long as said attachment means is not interrupted;

said straight rod being a single straight rod;

said second longitudinal end of said rod defining a thickening having a first diameter;

a guide assembly mounted to said inclined rearward tube and having a bushing for slideably engaging said straight rod; and, said bushing having a second diameter smaller than said first diameter.

* * * * *

UNITED STATES PATENT AND TRADEMARK OFFICE
CERTIFICATE OF CORRECTION

PATENT NO. : 5,772,165
DATED : June 30, 1998
INVENTOR(S) : Guenter Schroeder

It is certified that error appears in the above-identified patent and that said Letters Patent is hereby corrected as shown below:

```
    In column 4, line 52:  delete "connection" and substitute
-- connecting -- therefor.
```

Signed and Sealed this

Twenty-fifth Day of May, 1999

Attest:

Q. TODD DICKINSON

*Attesting Officer*     *Acting Commissioner of Patents and Trademarks*